(12) United States Patent
Wiers et al.

(10) Patent No.: US 7,578,476 B2
(45) Date of Patent: Aug. 25, 2009

(54) AIRCRAFT DOOR ARRANGEMENT

(75) Inventors: Andreas Wiers, Donauwoerth (DE);
Rainer Suchy, Donauwoerth (DE);
Steffen Kunze, Felkirchen-Westerham (DE); Matthias Steer, Augsburg (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 124 days.

(21) Appl. No.: 10/538,432

(22) PCT Filed: Dec. 5, 2003

(86) PCT No.: PCT/EP03/13752

§ 371 (c)(1),
(2), (4) Date: Sep. 7, 2006

(87) PCT Pub. No.: WO2004/052723

PCT Pub. Date: Jun. 24, 2004

(65) Prior Publication Data

US 2007/0095985 A1 May 3, 2007

(30) Foreign Application Priority Data

Dec. 11, 2002 (DE) ............................... 102 58 105

(51) Int. Cl.
*B64C 1/14* (2006.01)
(52) U.S. Cl. ...................... 244/129.5; 49/149
(58) Field of Classification Search ............. 244/129.5; 49/149, 157, 254, 255, 358
See application file for complete search history.

(56) References Cited

U.S. PATENT DOCUMENTS 5,123,557 A 6/1992 Drawbaugh ................. 220/203

(Continued)

FOREIGN PATENT DOCUMENTS

DE 463 993 C 8/1928

(Continued)

OTHER PUBLICATIONS

International Search Report for PCT/EP03/13752 (4 pages).

(Continued)

*Primary Examiner*—Michael R Mansen
*Assistant Examiner*—Michael Kreiner
(74) *Attorney, Agent, or Firm*—Darby & Darby (57) ABSTRACT

An aircraft door arrangement, especially for an airplane, comprising a door; a door frame; a support arm with a pivoting axis on the door side, on which the door is mounted so as to swivel, and a pivoting axis on the frame side, on which the support arm is mounted so as to swivel on the door frame, whereby at least the pivoting axis on the door side is defined by two articulated joints positioned at a distance from each other in the vertical direction of the support arm, of which articulated joints at least one articulated joint has two bearings positioned at a distance from each other in the vertical direction; a pivoting drive that is arranged in the area of the support arm on the door side and that serves to swivel the door; and a driven element that is coupled to the pivoting drive and to the door and that transmits an actuating movement of the pivoting drive to the door. The aircraft door arrangement is characterized in that one of the two bearings of at least one of the articulated joints on the frame side is configured as a pivoting drive mounting to which the pivoting drive is attached.

15 Claims, 7 Drawing Sheets

U.S. PATENT DOCUMENTS

| | | | |
|---|---|---|---|
| 5,156,359 A | 10/1992 | Noble et al. | 244/129.4 |
| 5,180,121 A | 1/1993 | Banks et al. | 244/129.5 |
| 6,742,744 B2 | 6/2004 | Schreitmueller et al. | 244/129.5 |
| 2002/0104926 A1 | 8/2002 | Marquard et al. | 244/129.5 |
| 2002/0139897 A1* | 10/2002 | Erben et al. | 244/129.5 |

FOREIGN PATENT DOCUMENTS

| | | |
|---|---|---|
| DE | 197 02 083 | 6/1998 |
| DE | 197 32 514 C1 | 10/1998 |
| DE | 100 32 851 A1 | 1/2002 |
| DE | 102 07 033 | 9/2003 |
| EP | 0 518 429 | 12/1992 |
| GB | 552 722 | 4/1943 |
| GB | 664 201 | 1/1952 |

OTHER PUBLICATIONS

Search Report of EP 03 01 4894 and brief translation thereof (3 pages).

* cited by examiner

PRIOR ART

AIRCRAFT DOOR ARRANGEMENT

The present invention relates to an aircraft door arrangement, especially for an airplane and, in turn, especially for an airplane with a pressurized cabin.

BACKGROUND

From various types of aircraft that have been in operation for a long time, an aircraft door arrangement is known that comprises a door, a door frame and a support arm. This support arm has a pivoting axis on the door side, on which the door is mounted so as to swivel, and it has a pivoting axis on the frame side, on which the support arm is mounted so as to swivel on the door frame. The pivoting axis on the door side is defined by two articulated joints positioned at a distance from each other in the vertical direction of the support arm, each articulated joint comprising two bifurcated bearings which are positioned at a distance from each other in the vertical direction and which are each formed by two eye plates. The door arrangement has a pivoting drive 104 that serves to swivel the door. This pivoting drive is configured as a linear actuator arranged laterally on the support arm, said actuator extending essentially over the entire width of the support arm. The left-hand side of the actuator in the drawing is attached to the support arm while its right-hand side is attached to a moveable driven element. This driven element, in turn, is coupled to the door and transmits an actuating movement of the actuator to the door. This mode of construction calls for a separate bearing arrangement for the driven element, an intermediate lever and numerous other components, an approach that has a detrimental effect on the overall weight of the door structure. Moreover, due to the linear actuator, which is installed laterally, the support arm has to have a considerable overall depth. Furthermore, this gives rise to long load paths. Due to the described mode of construction, the support arm is also subject to a relatively high load stemming from the reaction forces of the actuator. Consequently, the occurring forces have to be absorbed by component areas that are dimensioned to be correspondingly stronger which, in turn, increases the weight. This prior-art door arrangement is quite complex and costly.

Moreover, aircraft door arrangements generally entail the problem that the doors are subject to high stress caused by external loads such as, for instance, wind loads, blocking of the door and the like. These external loads exert particular stress on the bearings of the support arm on the door side, they deform the support arm and give rise to considerable stresses, distortion and bending of the pivoting drive, especially of its driven member, which likewise has a detrimental effect on the function and service life of the pivoting drive. In case of damage or wear and tear of the door attachment elements, of the support arm or of the bearings of the pivoting drive in prior-art aircraft door arrangements, it is hardly possible to repair the support arm. As a consequence, it is usually necessary to replace the entire support arm, which increases the repair or maintenance costs.

SUMMARY OF THE INVENTION

An object of the present invention is to provide a simple and effective aircraft door arrangement that avoids one or more of the above-mentioned drawbacks associated with the state of the art.

The present invention provides an aircraft door arrangement, especially for an airplane having a door, a door frame and a support arm with a pivoting axis on the door side, on which the door is mounted so as to swivel, and with a pivoting axis on the frame side, on which the support arm is mounted so as to swivel on the door frame, whereby at least the pivoting axis on the door side is defined by two articulated joints positioned at a distance from each other in the vertical direction of the support arm, of which articulated joints at least one articulated joint has two bearings positioned at a distance from each other in the vertical direction; a pivoting drive that is arranged in the area of the support arm on the door side and that serves to swivel the door; and a driven element that is coupled to the pivoting drive and to the door and that transmits an actuating movement of the pivoting drive to the door. The one of the two bearings of at least one of the articulated joints on the frame side is configured as a pivoting drive mounting to which the pivoting drive is attached.

The aircraft door arrangement according to the invention, especially for an airplane, comprises the following: a door; a door frame; a support arm with a pivoting axis on the door side, on which the door is mounted so as to swivel, and a pivoting axis on the frame side, on which the support arm is mounted so as to swivel on the door frame, whereby at least the pivoting axis on the door side is defined by two articulated joints positioned at a distance from each other in the vertical direction of the support arm, whereby at least one of said articulated joints has two bearings positioned at a distance from each other; a pivoting drive that is arranged in the area of the support arm on the door side and that serves to swivel the door; and a driven element that is coupled to the pivoting drive and to the door and that transmits an actuating movement of the pivoting drive to the door. The aircraft door arrangement according to the invention is characterized in that one of the two bearings of at least one of the articulated joints on the frame side (or else of both articulated joints) is configured as a pivoting drive mounting to which the pivoting drive is attached.

In other words, one bearing has been replaced by the pivoting drive mounting. The articulated joint in question is now formed by the pivoting drive mounting (or by the components attached to this mounting) and by the other bearing of this articulated joint. As a result, the pivoting drive can only be attached and mounted on bearings in one single place, namely, on the pivoting drive mounting, and consequently it can be installed in the immediate vicinity of an articulated joint and of the driven element. This translates into short and clear-cut load paths or load flows. Therefore, the pivoting drive mounting, which concurrently effectuates the bearing and attachment of the pivoting drive, mechanically introduces the reaction forces of the pivoting drive that occur during operation into the support arm in a very favorable manner.

Moreover, a simple, detachable attachment of the pivoting drive to the pivoting drive mounting (for example, by means of fitting pins, fitting bolts and the like) is possible. The direct attachment or suspension of the pivoting drive on the pivoting drive mounting—which, in a manner of speaking, is a bearing itself and is thus in the immediate vicinity of an articulated joint site—also allows a simple and effective alignment of the pivoting drive and thus a simple compensation for alignment flaws without additional, complex and heavy balancing devices. The pivoting drive, especially its driven member, can be aligned or centered directly on the pivoting drive mounting.

As a result of incorporating the pivoting drive in the immediate vicinity of an articulated joint or of a bearing of this articulated joint, no distortion or bending of the pivoting drive or of its driven member occurs when the door and the bearings of the support arm on the door side are subjected to an external load. Rather, when the support arm or the bearings are deformed, the pivoting drive can follow these movements load-free due to the fact that it is directly coupled or connected to the pivoting drive mounting. This makes a major contribution to improving the function and service life of the pivoting drive and thus to greater operating safety of the entire aircraft door arrangement.

Figure 7:
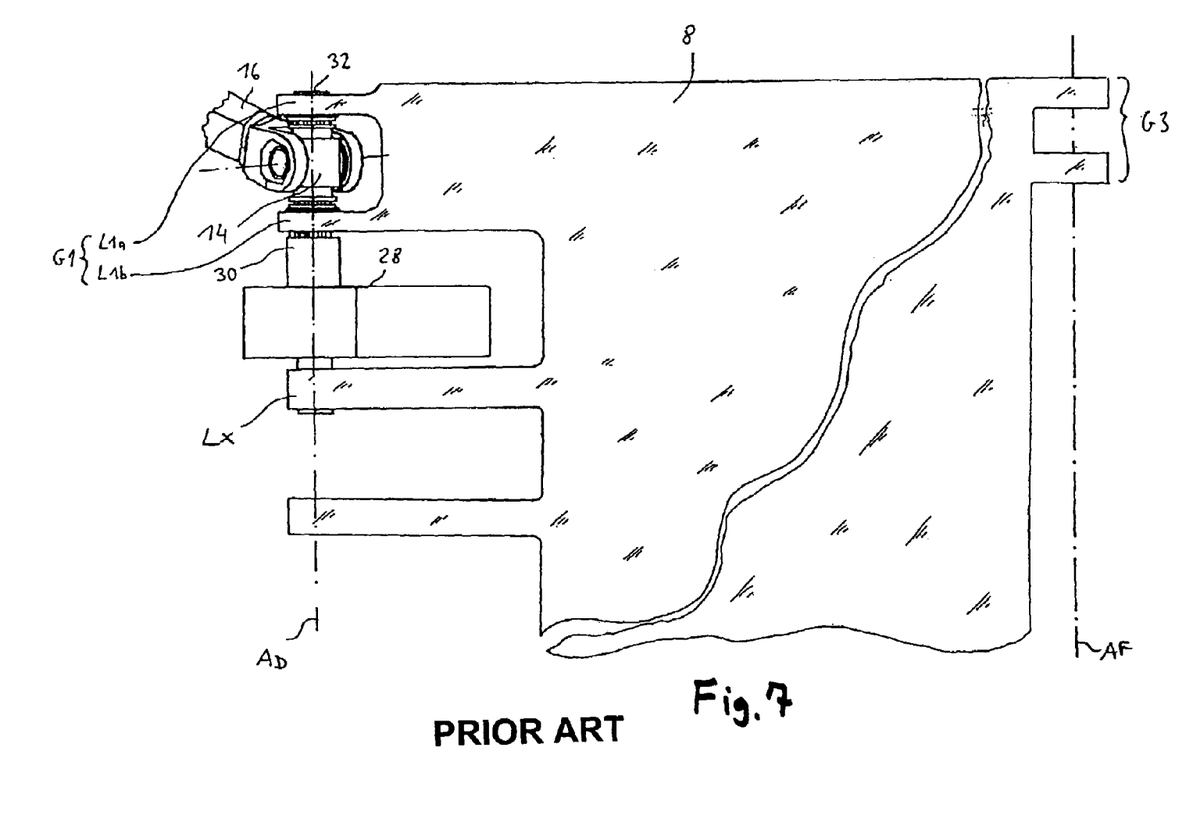

Owing to the replacement of one bearing of the particular articulated joint by the pivoting drive mounting, which itself or whose components assume a bearing function, and owing to the direct connection of the pivoting drive to this mounting, the overall space required for this part of the kinematic door system can be reduced or the space present in a support arm construction, especially the available height, can be better utilized and can serve for the integration of the pivoting drive into the support arm structure. In comparison to prior-art door arrangements, in which the pivoting drive extends laterally on the support arm, the door arrangement according to the invention can be constructed so as to be much narrower or thinner. As can be seen, for example, in a comparison with FIG. 7, in the case of the solution according to the invention, it is possible to dispense with the additional bearings that have been needed so far for the separate load-transmission means of a conventional pivoting drive.

Reducing the required space also allows excellent accessibility to the pivoting drive. If necessary, the pivoting drive can be easily detached from or attached to the pivoting drive mounting, which renders the assembly and disassembly work quick and easy. In this context, there is no need to disassemble the entire door. In case of damage or wear and tear of the attachment or bearing of the pivoting drive, the ease with which the pivoting drive mounting can be replaced means that it is likewise not necessary to replace the entire support arm. On the contrary, in many cases, it will be sufficient to merely replace the pivoting drive mounting. This is also advantageous when it comes to repairing the support arm. In this manner, maintenance and repair work can be simplified and costs for repair and maintenance can be cut.

Furthermore, in comparison to conventional constructions, the aircraft door arrangement according to the invention also drastically reduces the number of components needed for the door opening and closing functions which, in turn, lowers the weight and contributes to a lightweight construction.

The above-mentioned advantages are made possible particularly by the pivoting drive mounting, by its special arrangement and by its multiple functions.

Other preferred and advantageous embodiment features of the aircraft door arrangement according to the invention are the subject matter of the subordinate claims.

A preferred embodiment of the invention with additional configuration details and other advantages will be described and explained in greater depth below with reference to the accompanying drawings.

BRIEF DESCRIPTION OF THE DRAWINGS

The following is shown.

DETAILED DESCRIPTION

For purposes of avoiding duplications in the description that follows as well as in the figures, parts and components that are the same will be designated with the same reference numerals insofar as no further differentiation is necessary.

Figure 5:
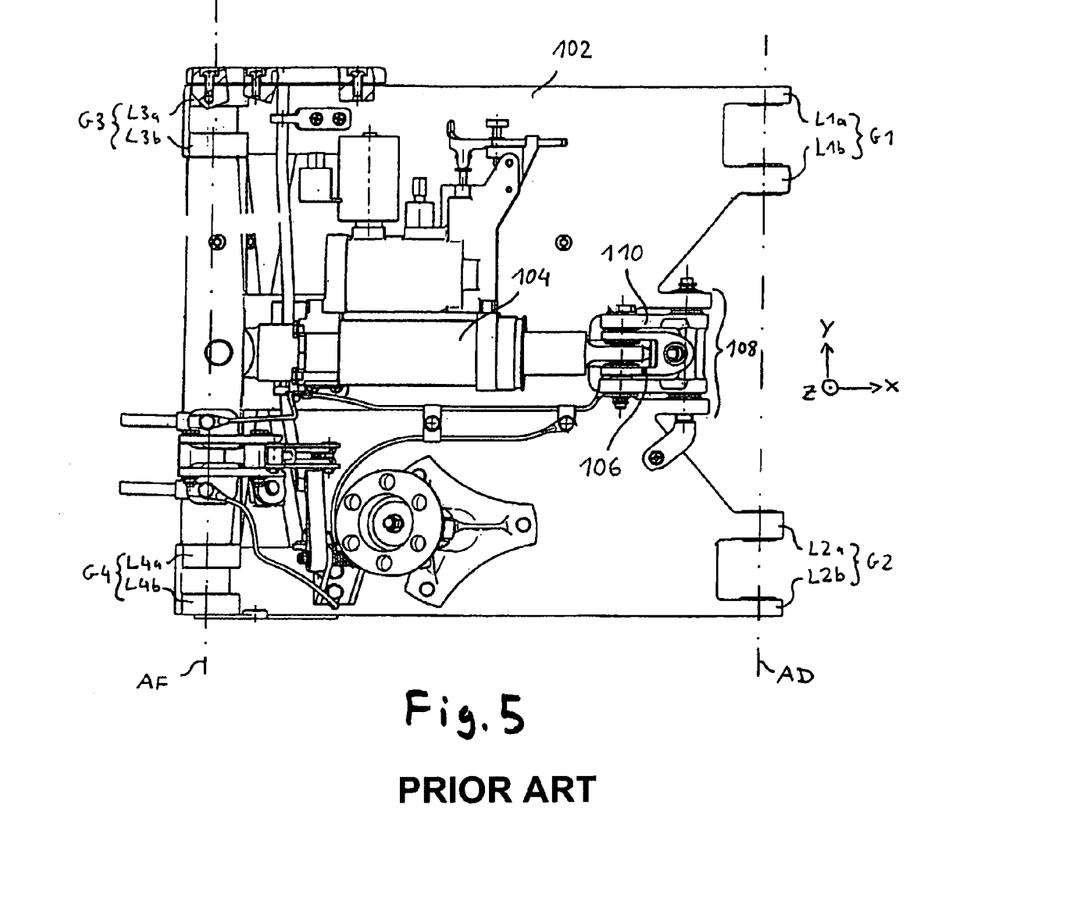
FIG. 5—a schematic perspective view of an aircraft door arrangement.
Figure 6:
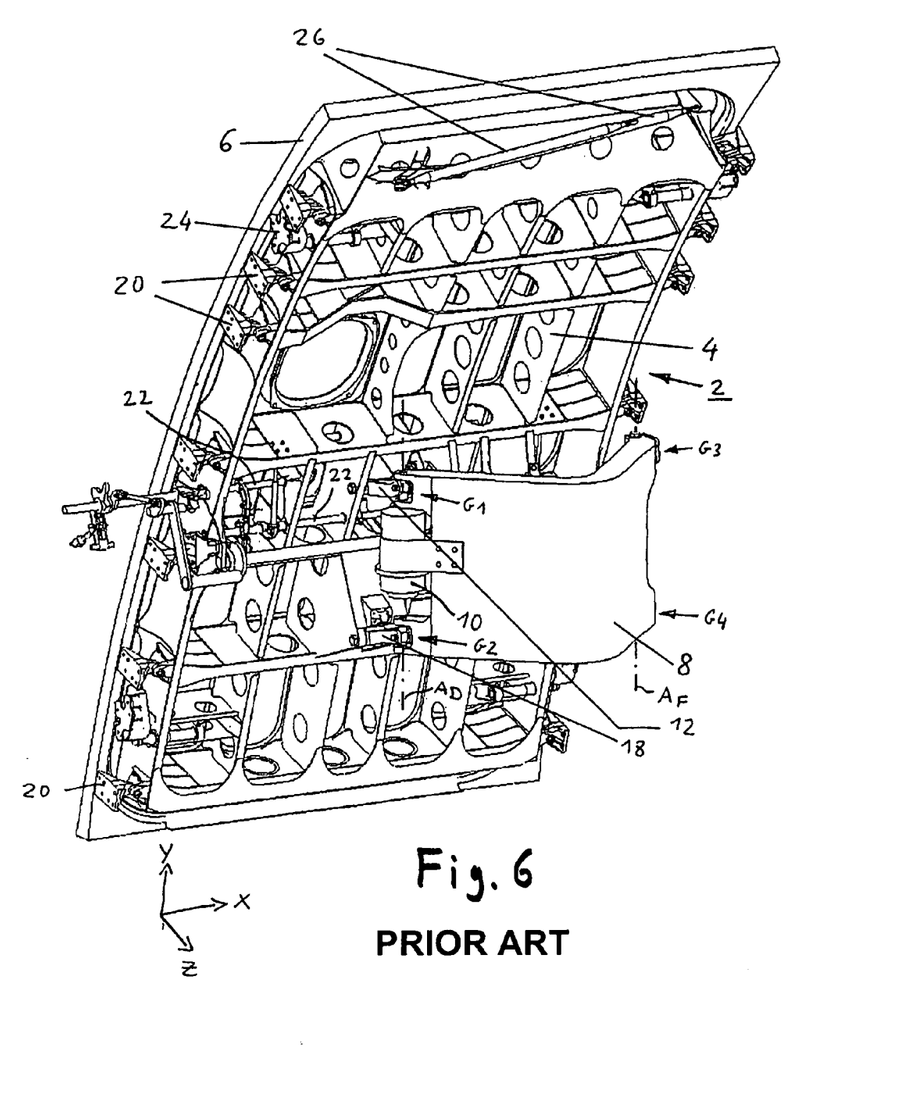

An aircraft door arrangement according to the invention as shown in FIG. 5 (here, for an airplane with a pressurized cabin), in the present embodiment comprises an airplane door 2 designed as a passenger door, with a door structure 4 and a door frame 6 that is formed by a frame structure of the fuselage. Moreover, the door arrangement comprises a support arm 8 that is preferably made of fiber composite material (for instance, carbon fiber reinforced plastic—CRP), of an aluminum alloy or of another suitable material or material combination. The support arm 8 has a pivoting axis AD on the door side, on which the door 2 is mounted so as to swivel laterally, while it has a pivoting axis AF on the frame side, on which the support arm 8 is mounted so as to swivel on the door frame 6. In an area of the support arm 8 on the door side, there is a pivoting drive 10 that serves to swivel the door 2. In the present case, this pivoting drive 10 is an electromechanical rotary actuator. The invention, however, is not restricted exclusively to this type of pivoting drive. Depending on the application case, other suitable pivoting drives such as, for example, hydraulic or pneumatic actuators, can also be used.

Figure 1:
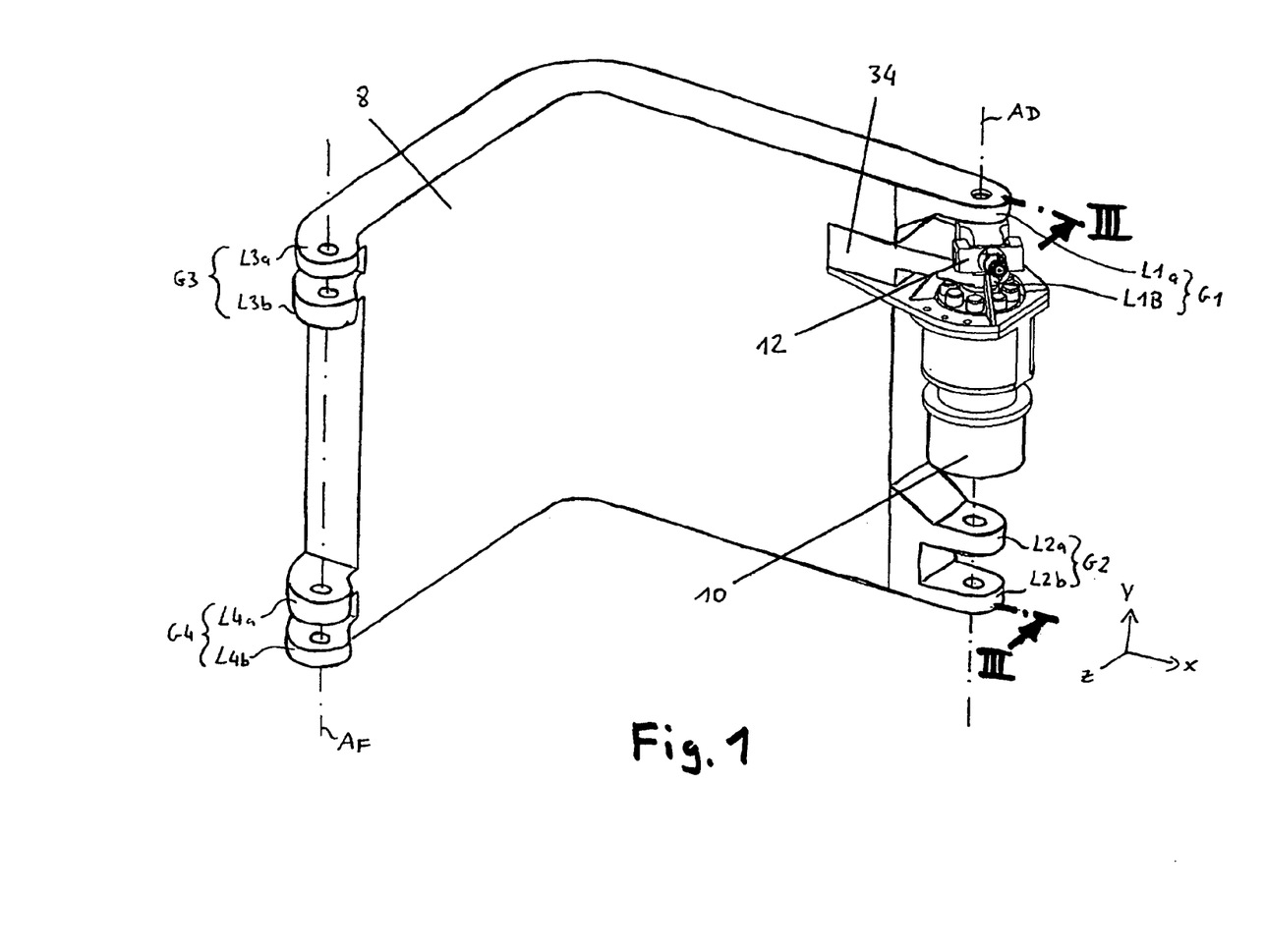
FIG. 1—a schematic perspective view of a support arm, of an aircraft door arrangement according to the invention.

FIG. 1 shows a schematic perspective view of the support arm 8 of an aircraft door arrangement according to the invention equipped with the pivoting drive 10. As can be seen in this drawing, the pivoting axis AF of the support arm 8 on the frame side, that is to say, the pivoting axis AF belonging to the door frame, is defined by two bifurcated articulated joints G3, G4 positioned at a distance from each other in the vertical direction Y of the support arm 8. Each articulated joint G3, G4 has two bearings L3a, L3b, L4a, L4b that are positioned at a distance from each other in the vertical direction Y. Each of these bearings L3a, L3b, L4a, L4b is formed by an eye plate.

The pivoting axis AD of the support arm 8 on the door side, that is to say, the pivoting axis AD belonging to the door 2, is defined by two articulated joints G1, G2 positioned at a distance from each other in the vertical direction Y of the support arm 8. The lower articulated joint G2 is designed similarly to the articulated joints G3 and G4, in other words, it is bifurcated and has two bearings L2a, L2b at a distance from each other in the vertical direction Y, which are each formed by an eye plate.

In contrast, the upper articulated joint G1 likewise has two bearings at a distance from each other in the vertical direction Y, but this articulated joint construction is designed fundamentally differently from the articulated joints G2, G3 and G4. To be more precise, one (here, L1B) of the two bearings L1a, L1B of the upper articulated joint G1 on the frame side is configured as a pivoting drive mounting 34 to which the pivoting drive 10 is attached. As can be seen in FIG. 1, the pivoting drive mounting 34 (or else components or areas thereof)—relative to vertical direction Y of the support arm—now forms the lower bearing L1B of the upper articulated joint (G1) of the two articulated joints G1, G2 on the door side.

It should be mentioned at this juncture that, depending on the design and positioning of the support arm 10 and on the requisite arrangement of the pivoting drive 10, the pivoting drive mounting 34—relative to vertical direction Y of the support arm 8—can, of course, also form the upper bearing L2*a* of the lower articulated joint (G2) of the two articulated joints G1, G2.

Moreover, as set forth in the invention, a construction can be realized, for example, with two pivoting drives, in which there are two pivoting drive mountings, namely, one on articulated joint G1 and the other on articulated joint G2.

The pivoting drive mounting 34 is preferably designed as an integral component (made, for instance, of aluminum alloy or titanium alloy, fiber composite material or the like) although, as a matter of principle, it can also be configured as a differential part. If the pivoting drive mounting 34 is positioned sufficiently precisely on the support arm 8, then said mounting can already be prepared or completely pre-assembled or else it can be reworked once it has been installed, that is to say, on the support arm 8, in order to achieve a precise alignment and positioning of the pivoting drive 10.

Figure 2:
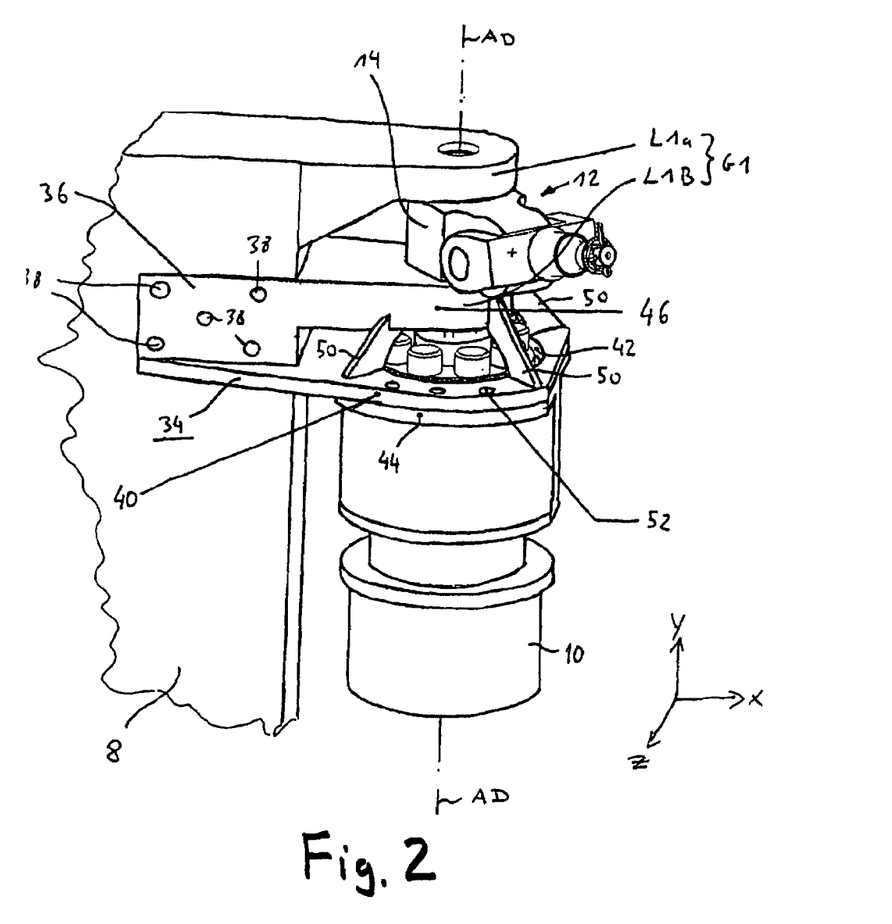
FIG. 2—an enlarged, perspective detailed view of the right-hand, upper area of the image from FIG. 1.

FIG. 2, which is an enlarged, perspective detailed view of the right-hand, upper area of the image from FIG. 1, shows additional details of the door arrangement according to the invention in the area of the articulated joint G1 of the support arm 8. In this example, the pivoting drive mounting 34 is configured as a separate part and it has a support arm attachment section 36 which, in this case, is designed so as to be bifurcated or claw-like and it also grasps two sides on the free edge of the support arm 8. Here, the inner surfaces of the bifurcated areas of the support arm attachment section 36 form contact surfaces that lie against the corresponding side surfaces of the support arm 8. The pivoting drive mounting 34 is detachably affixed to the support arm 8 by means of suitable attachment means 38. These attachment means 38 are screw bolts, fitting bolts and the like.

Moreover, the pivoting drive mounting 34 has a plate-like pivoting drive attachment section 40 (hereinafter referred to as baseplate 40) extending essentially vertically (and thus approximately in an X-Z plane) with respect to the pivoting axis AD on the door side, whereby said baseplate 40 has a passage opening 42 and can be connected to a front section or flange 44 of the pivoting drive 10. Express mention is hereby made of the fact that the invention is not restricted to this concrete embodiment of the pivoting drive attachment section 40. It goes without saying that the pivoting drive attachment section 40 can also be designed or shaped differently so as to be adapted to the particular type of pivoting drive used and to its adapter means. As can be seen in FIG. 2, the baseplate 40 laterally makes a transition to the support arm attachment section 36 or ends in the appertaining bifurcated areas of the support arm attachment section 36.

Above the baseplate 40 and at a distance thereto, the pivoting drive mounting 34 has a bearing section 46 (hereinafter referred to as bearing plate 46) with a bore and at least one bearing element 48 arranged in this bore (see FIG. 3), thus forming the bearing L1B of the articulated joint G1. According to the depiction in FIG. 2, the bearing plate 46 makes a transition to the support arm attachment section 36 on the left-hand side. Moreover, the bearing plate 46 is connected to the baseplate 40 by means of several ribs 50. The mode of construction described above essentially achieves lightweight construction and thus a low weight of the pivoting drive mounting 34. As a matter of principle, however, the pivoting drive mounting 34 can also be configured, for instance, with uninterrupted material transitions leading from the baseplate 40 to the bearing plate 46 and to the support arm attachment section 36 and the like, for example, in the form of a continuous connecting wall between the above-mentioned elements. Other, more massive modes of construction are likewise conceivable.

It can also be seen in FIG. 2 that the pivoting drive 10, via its front flange 44, is placed on the baseplate 40 from below and attached to said baseplate 40 in a detachable manner by means of attachment means 52 such as, for example, a screw-in connection or fitting pins and/or fitting bolts and the like. Here, an upper flange surface of the pivoting drive 10 is in contact with a lower contact surface of the baseplate 40. The contact reaction that occurs during operation due to the driving torque of the pivoting drive 10 is introduced in a positive manner into the pivoting drive mounting 34 via the attachment means 52 (or parts thereof), said mounting 34 then transmitting these forces to the support arm 8. However, a force transmission from the pivoting drive 10 to the pivoting drive mounting 34 can fundamentally also be achieved in a non-positive manner.

With the door arrangement according to the invention as shown in this embodiment, the pivoting drive 10 is arranged in the pivoting axis AD on the door side and between the two articulated joints G1 and G2. In this context, the pivoting axis AD on the door side runs right through the pivoting drive 10. Moreover, the pivoting drive 10 is arranged so as to be centered relative to the pivoting axis AD on the door side, so that the driven axis of the pivoting drive 10 is flush with the pivoting axis AD of the support arm 8 on the door side. The pivoting drive 10 or its driven axis can be aligned in a precisely flush manner in the mounted state of the pivoting drive 10, for example, by changing the position of the pivoting drive mounting 34 on the side of the support arm attachment section 36. Once in a suitable position, the support arm attachment section 36 can then be securely connected to the support arm 8. For this purpose, appropriate adjustment means can be provided on the support arm attachment section 36, on the support arm 8 itself or on the attachment means 38. If, in contrast, the support arm attachment section 36 is already attached in its final position on the support arm 8, then the position of the pivoting drive 10 can be adjusted and secured, for instance, by means of the baseplate 40 and/or the flange 44. Appropriate adjustment means can be provided here as well.

As can be seen especially clearly in FIGS. 1 and 2, between the upper bearing L1*a* and the pivoting drive mounting 34, a driven element 12 engages the support arm 8 and its pivoting drive 10. This driven element 12, which is directly or indirectly coupled on one side to the pivoting drive 10 and on the other side to the door 2, transmits the actuating or rotating movement of the pivoting drive 10 to the door. On the side of the support arm 8, the driven element 12 encompasses, for example, a universal joint 14 and an upper arm attached thereto, particularly an upper triangular arm 16, which extends all the way to the door. A corresponding universal joint as well as a lower arm or triangular arm are also to be found, although in a non-driven embodiment, on the lower articulated joint G2 of the support arm 8 on the door side.

Figure 3:
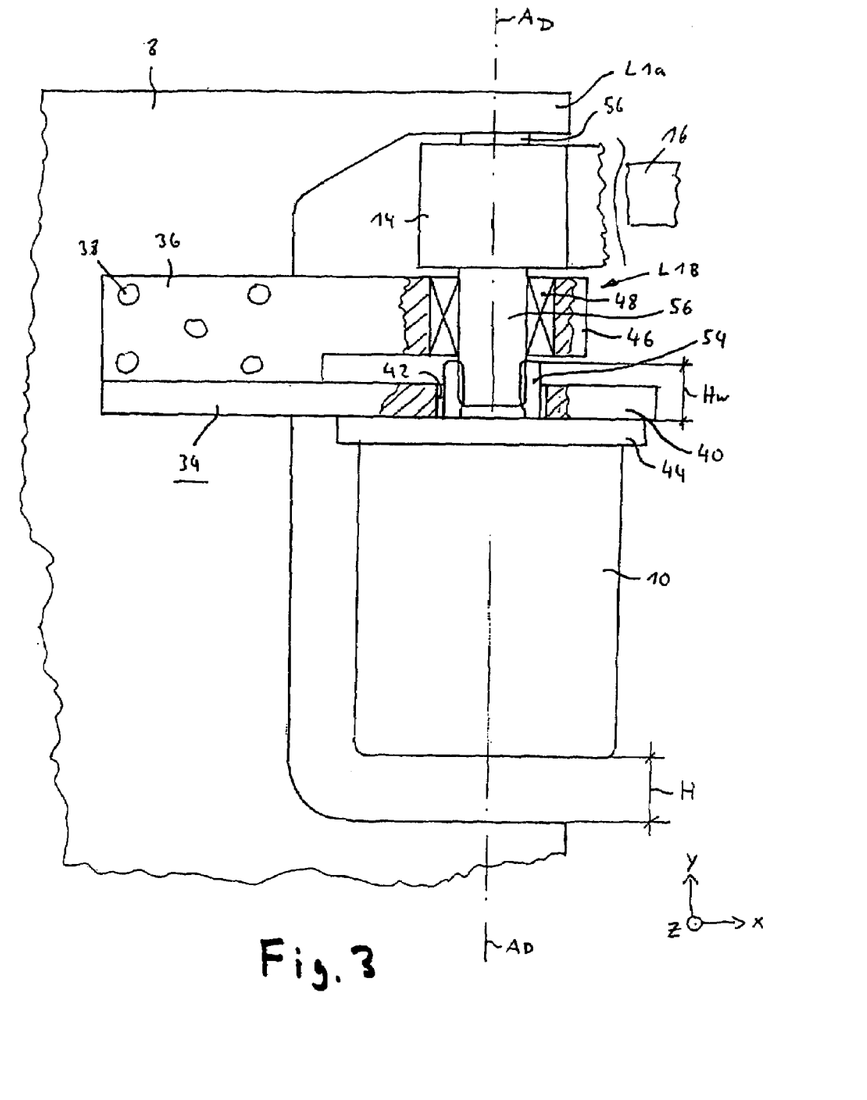
FIG. 3—a schematic sectional view along the line III-III of FIG. 1 for purposes of illustrating a first articulated joint variant of a support arm realized with a pivoting drive mounting.

FIG. 3, which depicts a schematic sectional view along the line III-III of FIG. 1, shows further details of this construction for purposes of illustrating a first articulated joint variant realized with a pivoting drive mounting 34. For the sake of clarity, the ribs 50 are not shown in FIG. 3.

As indicated in FIG. 3, the pivoting drive 10 has a hollow driven shaft 54 into which a bearing pin or hinge pin 56 engages non-rotatably with a first lower pin area. The hinge pin 56 extends flush with the pivoting axis AD on the door side all the way through the first bearing L1*a* and into the pivoting drive mounting 34 and through its bearing plate 46 and bearing element 48 into the hollow driven shaft 54. In a first upper area, the hinge pin 56 is non-rotatably connected to the universal joint 14 (as part of the driven element 12), as a result of which the transmission of force and torque from the pivoting drive 10 to the door is ensured. In a second lower area, that is to say, above the hollow driven shaft 54, the hinge pin 56 is mounted radially in the bearing element 48 of the bearing plate 46 and, in a second upper area, in other words, above the universal joint 14, it is mounted radially in the eye plate of the bearing L1a. An axial safety mechanism is advantageously provided for the hinge pin 56.

This mode of construction allows a particularly simple and effective assembly and disassembly of the pivoting drive 10. As is evident from the drawing, after the connection (attachment means 38) to the baseplate 40 has been detached, in order to be completely disassembled, the pivoting drive 10 only has to be pulled downwards for a short distance that actually corresponds to the length HW of the hollow driven shaft 54 that protrudes over the front of the flange 44. As a result, the requisite height H (H>HW) of the free space beneath the pivoting drive 10 is very small, which is an extremely advantageous aspect.

Figure 4:
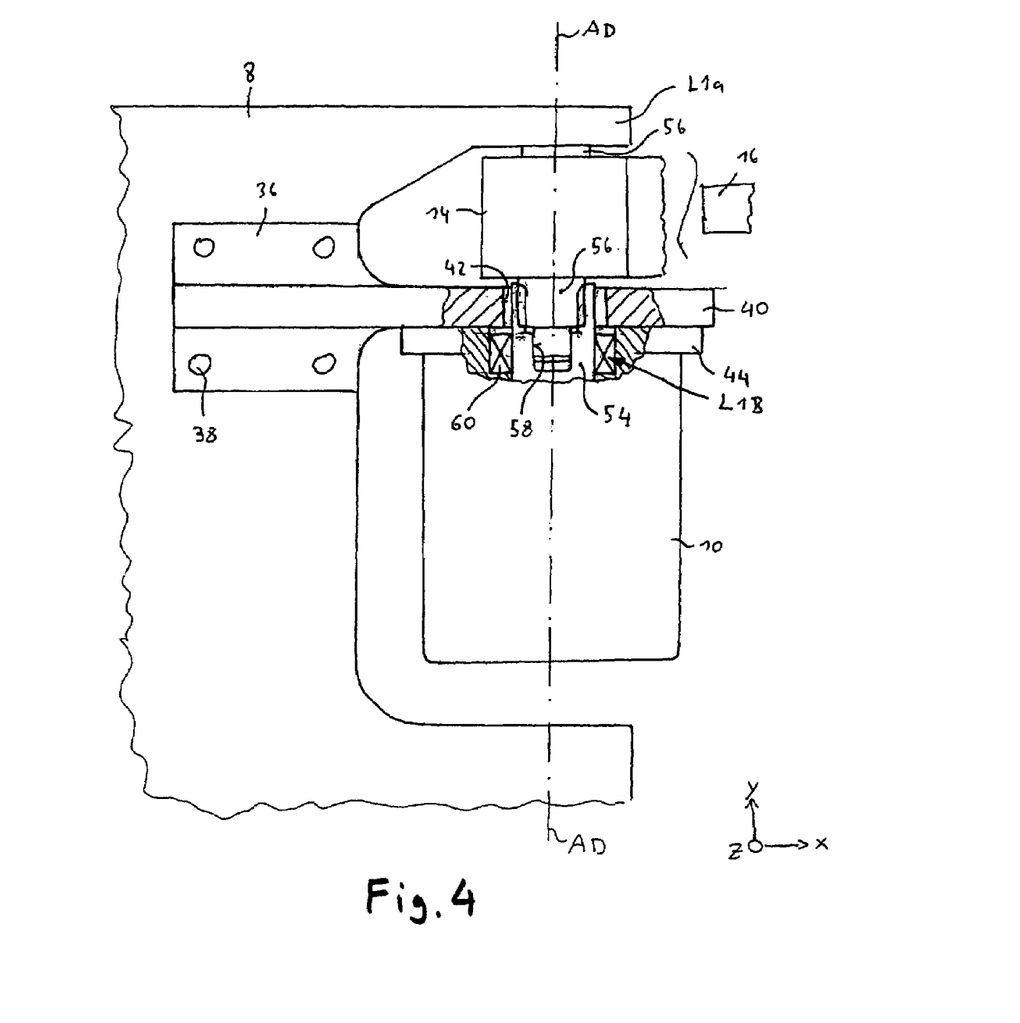
FIG. 4—a sectional view analogous to FIG. 3 for purposes of illustrating a second articulated joint variant of a support arm realized with a pivoting drive mounting.

FIG. 4 shows a sectional view analogous to FIG. 3 for purposes of illustrating a second articulated joint variant of the support arm 8 realized with the pivoting drive mounting 34. This embodiment dispenses with the bearing plate 46 and with the bearing element 48 of the pivoting drive mounting 34 of FIG. 3. Instead, the hinge pin 56 engages directly into the hollow driven shaft 54 via a radial centering fitting 58 and said hinge pin 56 rests radially on said driven shaft 54. Moreover, for the transmission of the torque, the hinge pin rests tangentially via its outer teeth on corresponding inner teeth of the hollow driven shaft 54. As indicated in the drawing, for example, a radial bearing 60 of the pivoting drive 10 itself can take over the function of the second bearing L1B of the articulated joint G1.

The invention is not restricted to the above-mentioned embodiment, which serves only to provide a general explanation of the core idea of the invention. Rather, within the framework of the protective scope, the aircraft door arrangement according to the invention can assume numerous embodiments other than the concrete one described above. Even though, in the above-mentioned embodiment, the pivoting drive mounting is configured as a separate part, the pivoting drive mounting can fundamentally also be configured integrally with the swiveling arm. It is also possible for the driven axis of the pivoting drive to run laterally to the hinge axis of the support arm on the door side. This is the case, for example, when the driven axis is not connected directly to the bearing pin or to the driven element but rather via at least another driving member that is inserted laterally.

The function of the hinge pin described in the embodiment above, which is non-rotatably connected to the driven element, can also be taken over by a driven shaft of the pivoting drive. Therefore, when it comes to the articulated joint of the support arm on which the pivoting drive mounting is provided, the driven shaft of the pivoting drive/actuator is part of the articulated joint mechanism and defines a partial section of the pivoting axis AD on the door side. The articulated joints (or parts thereof) of the support arm do not necessarily have to be bifurcated or have a design involving an eye plate. Particularly the articulated joints G2, G3 and G4 can be realized through other suitable articulated joint or bearing means such as, for instance, ball-and-socket joints, hinges, linkage rods and the like as well as by mixed forms thereof.

The embodiment and arrangement according to the invention of the pivoting drive mounting can also be employed on the articulated joints of the pivoting axis of the support arm on the frame side if the pivoting drive is arranged on the pivoting axis on the frame side. Moreover, based on the principle according to the invention, aircraft door arrangements can be realized in which the door does not swivel to the side but rather, for instance, upwards or downwards, for example, around a horizontal axis, in the manner of a gull-wing door.

The reference numerals in the claims, in the description and in the drawings serve merely for purposes of better elucidation of the invention and should not be construed as limiting the scope of protection.

LIST OF REFERENCE NUMERALS

The Numerals Stand for the Following:
2 door
4 door structure
6 door frame
8 support arm
10 pivoting drive
12 driven element
14 universal joint of 12
16 upper triangular arm
18 lower triangular arm
20 contact mountings
22 shafts
24 guiding plates
26 control arm
28 force transmission means
30 shaft of 28
32 pivot pin of 14
34 pivoting drive mounting
36 support arm attachment section of 34
38 attachment means
40 pivoting drive attachment section/baseplate of 34
42 passage opening in 40
44 front section/flange of 10
46 bearing section/bearing plate of 34
48 bearing element in 46
50 ribs
52 attachment means
54 hollow driven shaft of 10
56 hinge pin
58 centering fitting
60 radial bearing of 10
102 support arm
104 pivoting drive/actuator
106 driven element
108 bearing arrangement for 106
110 intermediate lever
AD pivoting axis on the door side
AF pivoting axis on the frame side
G1 articulated joint of 8 on the door side
G2 articulated joint of 8 on the door side
G3 articulated joint of 8 on the frame side
G4 articulated joint of 8 on the frame side
H necessary height for assembly/disassembly of 10
HW outer length of 54 in the Y direction
L1a bearing
L1b bearing
L2a bearing
L2b bearing
L3a bearing
L3b bearing
L4a bearing
L4b bearing
Lx additional bearing for 106
L1B bearing, formed by 34
X width direction
Y height direction
Z depth direction

What is claimed is:

1. An aircraft door arrangement, comprising:
    a door;
    a door frame;
    a support arm having a door side pivoting axis defined by two articulated joints disposed at a distance from each other in a vertical direction of the support arm and a frame side pivoting axis, the door disposed on the support arm and pivotable about the door side pivoting axis and the support arm disposed on the frame and pivotable about the frame side pivoting axis, wherein at least one of the articulated joints includes two bearings disposed at a distance from each other in the vertical direction, one of the two bearings configured as a pivoting drive mounting;
    a pivoting drive fixedly mounted to the pivoting drive mounting, and wholly supported by the pivoting drive mounting; and
    a driven element non-rotatably coupled to the pivoting drive and to the door, wherein an actuating movement of the pivoting drive rotates the pivoting drive element relative to the pivoting drive mounting so as to pivot the door relative to the support arm.

2. The aircraft door arrangement as recited in claim 1, wherein, relative to the vertical direction, the upper one of the two articulated joint includes the two bearings and the lower one of the two bearings is configured as the pivoting drive mounting.

3. The aircraft door arrangement as recited in claim 1, wherein, relative to the vertical direction, the lower one of the two articulated joint includes the two bearings and the upper one of the two bearings is configured as the pivoting drive mounting.

4. The aircraft door arrangement as recited in claim 1, further comprising an attachment device configured to detachably affix the pivoting drive mounting to the support arm.

5. The aircraft door arrangement as recited in claim 1, wherein the pivoting drive mounting is configured integrally with the support arm.

6. The aircraft door arrangement as recited in claim 1, the pivoting drive mounting includes a bearing section, the bearing being formed in the bearing section.

7. The aircraft door arrangement as recited in claim 1, wherein the pivoting drive mounting includes a pivoting drive attachment section extending essentially vertically with respect to the door side pivoting axis and connected to a front section of the pivoting drive.

8. The aircraft door arrangement as recited in claim 1, wherein the pivoting drive includes a support arm attachment section.

9. The aircraft door arrangement as recited in claim 1, wherein the pivoting drive mounting has a driven axis disposed flush with the door side pivoting axis.

10. The aircraft door arrangement as recited in claim 1, wherein the pivoting drive is disposed in the door side pivoting axis and between the two articulated joints.

11. The aircraft door arrangement as recited in claim 1, wherein the pivoting drive includes a hollow driven shaft and a bearing pin engaging non-rotatably into the shaft, the bearing pin extending all the way through the first bearing and into the pivoting drive mounting, and wherein the driven element is connected non-rotatably to the bearing pin.

12. The aircraft door arrangement as recited in claim 1, wherein a portion of the pivoting drive attached to the pivoting drive mounting forms a hinge site.

13. The aircraft door arrangement as recited in claim 1, wherein a driven shaft of the pivoting drive forms a hinge pin of the one articulated joint on which the pivoting drive mounting is disposed, and wherein the driven element is rotatably connected to the driven shaft.

14. The aircraft door arrangement as recited in claim 1, wherein the driven element engages the support arm between the pivoting drive mounting and the other of the two bearings.

15. The aircraft door arrangement as recited in claim 1, wherein the door is a passenger door.

* * * * *

UNITED STATES PATENT AND TRADEMARK OFFICE
CERTIFICATE OF CORRECTION

PATENT NO.         : 7,578,476 B2                                        Page 1 of 1
APPLICATION NO.    : 10/538432
DATED              : August 25, 2009
INVENTOR(S)        : Wiers et al.

It is certified that error appears in the above-identified patent and that said Letters Patent is hereby corrected as shown below:

In the face of the patent, under Inventors: Item (75)

Please delete "Matthias Steer" and insert -- Matthias Sterr -- therefor.

Signed and Sealed this

Twenty-seventh Day of October, 2009

David J. Kappos
*Director of the United States Patent and Trademark Office*